Patented June 4, 1940

2,203,643

UNITED STATES PATENT OFFICE 2,203,643

THICKENED FOOD COMPOSITIONS AND METHOD FOR PRODUCING THEM

Albert Musher, New York, N. Y., assignor to Musher Corporation, Elizabeth, N. J.

No Drawing. Application September 26, 1938
Serial No. 231,639

11 Claims. (Cl. 99—144)

The present invention relates to compositions and methods for thickening plastic, semi-liquid or liquid food materials.

The present application is a continuation in part of application, Serial Number 145,627, filed May 29, 1937. It is particularly directed to thickening food materials of a soft, fluid, or flowing nature, especially where such food materials constitute the primary, characteristic or principal part of the final preparation.

Many types of food compositions such as salad dressings, jellies, prepared mustards, peanut or other nut butters, catsup, spreads, sauces, drinks, icings, syrups, and so forth do not have desirable thickness or body.

Moreover many of these food compositions do not possess desirable spreading characteristics. Where there is a high moisture, high oil or high fluid content, they tend to soak into, and to cause sogginess, when spread upon foods such as bread or cake, and they tend to result in rapid deterioration of the sandwich or other food preparation in which they are used.

It is among the objects of the present invention to provide improved food compositions of the character above described, whether they be salad dressings, various types of spreads, icings, syrups, nut butters, sauces, honey, maple syrup, molasses, mustards, jellies, jams, liquid drinks and so forth, in which the normally soft, thin-bodied, semi-liquid, or liquid food composition may be readily thickened to eliminate or to reduce this softness or liquidity and the tendency of these products towards producing sogginess, and so as to enable them to be used to better advantage in sandwiches or as spreads upon bread, cake and other similar materials.

Other and further objects and advantages will also appear from the more detailed description given below, it being understood, however, that this more detailed description is given by way of illustration and explanation only, and not by way of limitation, since many changes therein may be made by those skilled in the art without departing from the scope and spirit of the present invention.

In accomplishing the above objects it has been found most satisfactory according to at least one prepared procedure to introduce starch, gums, pectin, gelatin or other water absorbents, water bodiers, or bodier materials, and also a relatively non-liquid oil, hard fat, hydrogenated oil, or similar non-water miscible material, with water where necessary, into a soft or fluid food composition. These materials may be introduced in any preferred or required sequence.

It has been found possible to cause a uniform dispersion of the water absorbent or binder material, such as starch, and the non-water miscible material, such as the hard fat, in the fluid food component, when these materials are thoroughly combined in such proportions in respect to the water present that the water will gelatinize or form a relatively thick paste or jelly with the starch or other suitable water absorbent material.

The preferred food materials to be thickened should generally contain over around 20% and preferably they should contain over 35% or 40% of water, liquid oil, syrups, or other fluids, liquids, or combinations thereof.

Although the relative proportions of the starch or other bodier, and the fat or similar materials, and the primary food material may be widely varied, it has been found suitable in many instances to combine with the primary food composition an amount of starch or other water-bodier and an amount of hard fat, the combined weight of which will range from one-twentieth to the same weight of the water, liquid oil, syrup or other fluid material or combinations thereof that are present in the entire food composition.

It has also been found desirable in many cases to use the non-liquid oil or hard fat or similar non-water miscible material in greater quantity than the weight of the dry starch or other dry water bodier material, the proportions ranging for example up to 20 parts of the non-liquid oil or hard fat for each 1 part of the dry bodier material. These should be computed on the basis of the dry bodier materials, hard fat, etc., or combinations therecf in the entire food composition.

In one preferred method of thickening or forming solid or form-sustaining food compositions the starch or other bodying material is first heated or mixed with a relatively non-solid aqueous food material to form a very thick paste or jelly. These aqueous food materials may take the form of liquid mustard, chocolate syrup, salad dressings, soups, wines, liquors, chili sauce, catsup, and so forth.

After the starch for instance, has been thoroughly combined, upon heating or boiling, with or without whipping, with the aqueous food material to form a relatively thick paste, the hard fat or hydrogenated oil may then be incorporated thoroughly into the mixture with the resultant formation of a starch-fat dispersion, which will have the effect of giving body to the food composition and making it quite plastic so that it will have entirely new spreading qualities so as to be readily spread and yet hold its position when so spread. Also, the resultant product will be devoid of or have a decreased tendency toward sogginess.

It is also, of course, possible to mix, whip or beat the hard fat with the thin, soft or fluid food material to be solidified or rigidified followed by adding the starch and then cooking, or followed by adding the starch-water paste produced by cooking them together. In this case however it is usually preferable to add the fat while it is melted and preferably while maintaining the entire mixture at the fat-melting temperature. Generally, however, the procedure first above set forth is preferred.

It has been found most suprisingly by employment of this starch-hard fat combination or similar bodier-hard fat combination as a thickener or solidifier or bodier material that the final food composition lacks the undesirable starchy or gummy objectionable characteristics that usually result in food materials having a starch or gum base and also it lacks the undesirable fatty or oily taste and characteristics which usually are found with materials having a large or substantial amount of a non-liquid oil or hard fat in their composition.

It has been found that this combination of hard fat and starch, for instance, gives rise to an entirely new character to the food compositions with which it is used.

The present invention is not limited to the use of any particular hard or hardened fat or oil or combinations thereof, and it is possible to employ various hardened fats and oils consisting of, containing or derived from olive oil, cottonseed oil, corn oil, peanut oil, cocoanut oil, oleo oil, oleo stock, oleostearin, lard, and other edible vegetable and animal oils and fats, in their natural states, or that have been fully or partially hydrogenated, or otherwise treated. Such components may be utilized in mixtures in such proportions as to give a relatively hard fat, that is, a fatty component of more or less solid consistency, desirably having a melting point of from 70 to 120° F., but for preferred purposes having a narrower range of melting point, as, for example, from 90° F. to 115° F.

It is also possible to use water absorbent bodier or thickener materials other than corn starch, such as tapioca, agar agar, pectin, gelatin, albumens, casein, dextrins, sugars, and gums, as for example, tragacanth, arabic, karaya, etc. Combinations of such water-absorbent or binder bodier components may be utilized, employing several of these materials simultaneously, if desired. Heat should be used where required to develop or increase the water absorption or body of these materials.

While any desired combination of such hard fat or similar materials and water absorbent or bodier compounds may be made, the final composition should desirably be made of a mixture of components in proportions to yield a relatively smooth, non-separated material particularly after the composition is beaten.

This combination should desirably include a sufficient amount of water absorbent or bodier material and the proper amount of water or aqueous material in proportions that will form a relatively thick paste of a homogeneous, non-separated condition. In many cases it is desirable to process the composition either in its final or semi-final form by passing it through a homogenizer, colloid mill or similar apparatus so as to aid in producing a much smoother and more intimately combined product.

In many cases it has been found desirable to melt the fat or similar materials while adding them to the composition and also it has been found desirable in many cases to heat the fat or similar material to a temperature just below its melting point so as to get this material into its softest condition and thereby to enable more intimate admixture when it is beaten or mixed with the composition.

Generally, the thin, fluid or aqueous basic food component constitutes between about 50% and 90% of the finished thickened food composition, or it constitutes the primary or characteristic component of the food composition. However in many cases the basic characteristics of the principal food component, as for instance the flavor, etc. may be maintained or produced in the final thickened product although substantially smaller amounts of this basic food component is used. This is usually accomplished by concentrating the flavor in the basic food component, or by adding flavor to the bodier materials, and by various other methods.

The compositions of this invention are preferably not thickened beyond a spreadable condition at room temperature.

Also, the compositions of the present invention are particularly advantageous in that both the water soluble and the oil soluble flavors of the foodstuff are most fully developed because of the presence of materials which aid development of and solubilize both of these classes of ingredients.

*Example I*

In making a thickened catsup product, which will be substantially thickened so as to have the new improved qualities of this invention, there is mixed together thoroughly 200 grams of catsup with 11 grams of gum karaya. There is then added to this combination 60 grams of plastic hydrogenated cottonseed oil with a melting point of around 98° F. This is mixed thoroughly and it is then ready to be packaged into containers.

This product is of a smooth plastic form. It does not soak into bread, or similar food to the same extent as ordinary catsup and it has much more improved spreading qualities. Also because of the new characteristics of the product there is not the separation of the water or vinegar from the catsup to the same extent as there is in the liquid type of catsup. In order to obtain an even smoother product, this catsup combination may be homogenized or passed through a colloid mill or similar apparatus.

*Example II*

To make an improved thickened prepared mustard product there should be used 6 grams of gum tragacanth, 150 grams of liquid prepared mustard and 50 grams of plastic hydrogenated cottonseed oil of a melting point of around 98° F. The method for the manufacture of this product is the same as given in Example I.

There will result with the proportions as noted above, a prepared mustard which will not have the disadvantages of ordinary liquid prepared mustard, but will have improved qualities of texture and smoothness, with a reduced tendency towards "oozing" and sogging when used for instance in conjunction with bread in the making of sandwiches. Also the water or vinegar in this product will not separate to the same extent as in usual liquid mustard.

Example III

To make substantially thicker mustard 150 grams of liquid prepared mustard is mixed well with 8 grams of gum tragacanth until the prepared mustard thickens. Thereupon, 65 grams of a hard fat of 110° melting point is added at a temperature of 120° F. slowly to the mustard-tragacanth combination while the mixture is being beaten.

After all of the melted fat is beaten into the product, the resulting composition is permitted to solidify.

Example IV

In the making of a thickened substantially solid catsup, 200 grams of catsup, 15 grams of tragacanth, and 70 grams of melted hardened fat of 110° melting point may be used in accord with the directions given in the above preceding example.

Example V

Maple syrup with an equal amount of water may be cooked with 13% of cornstarch based on the total weight. After thorough cooking, the melted 110° melting point hard fat may be incorporated with stirring or whipping, utilizing about 50% hard fat based upon the amount of diluted maple syrup present. The resulting product particularly after setting or cooling is a substantially thickened maple syrup which may be readily used as a spread or for other purposes. In a like way other sugar syrups, wine sauces, etc., may be similarly rigidified.

This composition, as well as other compositions, may be suitably flavored with various essential oils or with water soluble flavors or it may be combined with various other flavoring materials or food components, as for instance, nuts, raisins, etc.

Generally when bodier materials such as cornstarch, tapioca flour, or gums, are added to sugar syrups as for instance maple syrup, or honey, whether or not the bodier material requires heat, the resulting composition does not exhibit as much body as that which is normally obtained when such water bodier agents are cooked with water or materials having a high aqueous content. Generally, therefore, in many cases, it is desirable in producing the paste materials with such substances as maple syrup, honey and other similar syrups that an additional amount of water be added to the syrup before treating with the water bodier materials in order to form a paste material of the desired consistency.

Example VI

An example which illustrates the use of powdered sugar as a bodier material is made by mixing together 80 grams of strawberry jam and 25 grams of powdered sugar. These are both mixed well together and heated to a temperature of around 140° F. After these are heated the mixture is allowed to cool to 80° F.

Of this strawberry-sugar combination 50 grams is mixed with 15 grams of hydrogenated oil of 98° F. melting point, and 15 grams of hardened vegetable oil of 110° F. melting point. The 98° fat is mixed well into the jam composition and the 110° fat is melted and is mixed with the combination while the temperature of the fat is 120° F.

This combination is then beaten very thoroughly until the product congeals. Thereupon after it stands or cools it is formed into a thickened plastic strawberry jam with substantially improved spreading qualities. It is possible to substantially thicken maple syrup, honey and similar materials in the above manner except to vary the proportions of the materials used as required. For a thickened honey example, substitute the honey for the strawberry jam. For an example of a thickened maple syrup, substitute the maple syrup for the strawberry jam and increase the sugar to 50 grams. Various sugars, as for instance sucrose, levulose, dextrose, etc., may be used for the bodier material in necessary amounts.

Example VII

In the making of a thickened honey, the honey may be well mixed with skim milk powder as the bodier material in the proportions of 50 grams of honey with 20 grams of skim milk powder. Usually an improved product will result if the honey and milk powder are heated together carefully to about 140° F., with stirring to prevent burning. Into this should be well mixed 15 grams of 98° melting point hydrogenated oil. To form a substantially more solid honey material used 20 grams of melted 110° melting point hard fat instead of the 98° F. fat, and beat together well. The fluidity, stickiness and "runny" quality of syrupy materials such as maple syrup, molasses, corn syrup, etc., may thus be agreeably reduced or eliminated.

It is also possible to thicken prepared or semi-prepared food materials by adding reduced quantities of the bodier components, or by eliminating the added bodier component where a sufficient amount of bodier component is already present in the food material, as for example, where the basic food material already contains starch, gums, sugar, or other suitable bodying materials. Likewise the hard fat component may be reduced or eliminated in those cases where the basic food material contains an amount of hard fat or non-liquid oil.

Example VIII

As an example, 100 grams of marshmallow whip, which usually contains water soluble bodier materials such as gum arabic, etc., (although in some cases the water bodier materials may preferably be increased), may be incorporated with about 15 grams of water. To this is added 25 grams of 98° F. melting point hydrogenated cottonseed oil which is beaten in well. Then, 25 grams of 110° F. melting point vegetable stearine is melted and added slowly at a temperature of 120° F. to the marshmallow material while it is being beaten. An improved marshmallow material is now obtained or, if desired, after the incorporation of the fat with the marshmallow, 100 grams of peanut butter may be added to produce a thickened peanut butter-marshmallow combination. The proportions of the 98° melting point and the 110° melting point fat may be varied to give the required body.

Example IX

A thickened maple syrup material may be made by heating maple syrup in a double boiler so as to substantially concentrate its sugar content instead of adding additional sugar as the bodier material. The maple syrup may be boiled at a temperature of 180° F. so as to reduce its weight from 200 grams to 170 grams. To 50 grams of this concentrate which has been cooled to 80° F. there is added 18 grams of melted 110° melting point hard fat and the combination then mixed together well until it congeals. If it is desired to make a less solid maple syrup product use 30 grams of 98° melting point fat instead of the 110° fat and mix this without melting.

There is formed a maple syrup product which has characteristics far superior to ordinary maple syrup in that it is not of the liquid flowing type which is very "runny" when poured over griddle cakes or wheat cakes. It also has a spreading quality which is not found in fluid maple syrup.

As a further procedure it is possible to first mix the dry bodier material such as the dry starch or dry gum with the basic food component in a non-aqueous or dehydrated form. The combined dry mixture of the food and water bodier may then be formed into a semi-prepared liquid or relatively thin bodied food material by mixing or heating with water or other aqueous material. Then the hard fat may be added with heating, if desired to melt the fat, and with beating in order to thoroughly combine the materials. Also, if required, all of the components, both aqueous and non-aqueous, may be mixed, heated or processed together at the same time, or less preferably, the dry foodstuff, bodier and fat may all be mixed together and the water, aqueous material, etc., added, or various other sequences may be used. This procedure is of particular value in such cases, for example, where it is required, for commercial operation, to use, a dehydrated catsup in place of the product in its normally fluid form, and where it is desired to produce the final thickened foodstuff in one operation.

Example X

To make a thickened prepared mustard in accord with the above noted procedure, mix together dry mustard 20 grams, salt, sugar, turmeric and other condiments and seasonings 15 grams, and gum tragacanth 4 grams. Then add to this 25 grams of distilled vinegar and mix all together well. Then mix this with 25 grams of hydrogenated 98° F. melting point cottonseed oil. This will result in a finished thickened prepared mustard. Instead of first combining the dry materials and then adding the vinegar, and then adding the hydrogenated oil, all of the components may be mixed together to give the required result, or various other sequences may be used.

In like manner, there may be made a thickened catsup with dried or dehydrated catsup or with dehydrated tomato powder to which is added the seasonings and condiments necessary to produce a concentrated dry catsup which material may then be treated with the bodier such as starch or gums and with the hard fat component in the presence of water or aqueous materials to produce a finished thickened catsup.

As a further procedure the bodier, as for example, the starch, may first be combined by heating with just sufficient water to form the thick paste or jelly and then the hard fat may be thoroughly incorporated into the starch-water paste by heating or whipping, with the resultant formation of a homogeneous and uniform mixture which then may be added, with or without some heating, directly to the liquid or viscous foodstuffs to thicken them or to give them the desired spreading quality and other characteristics.

Example XI

The following is an example of a prepared product which may be used to mix with various food components so as to thicken them. Prepare the heavy bodier material by heating together until a thick paste is obtained, 210 grams of cornstarch with 155 grams of water and 770 grams of vinegar to which has been added 470 grams of condiment materials including salt, sugar and spice. Of this bodier material 390 grams is beaten until cooled. Then add 450 grams of 98° melting point hydrogenated oil and add part at a time to the cooled bodier material. Then beat the product well.

This prepared thickener composition may then be used for thickening or solidifying various food products and particularly those of a condiment nature, such as salad dressings, catsup, chili sauce, prepared mustard, and so forth. For thickening non-condiment or other foods, the thickener material may be prepared with the required flavors and seasonings in place of the salt, vinegar, etc., included in this example. In adding this thickener material to various food components it is usually desirable to heat it somewhat so as to have it as soft as possible, preferably without melting or separating it, when adding. Also it is in many cases desirable to pass the finished product through a colloid mill, homogenizer, or to give it a similar process. It is also found desirable, at times, instead of softening the thickener material before adding it, to first mix together this material with the food component and then to heat these together carefully while stirring until any flocculency disappears or until the mixture becames smooth. This point will usually be at about the melting point of the fat or slightly above it. The homogenization or colloid mill treatment in some cases may also be carried on at this temperature.

Example XII

To thicken a fluid catsup with the prepared product of Example XI given above, 25 grams of this product may be mixed with 100 grams of catsup. After these materials have been mixed together well heat the mixture uniformly and carefully while stirring, until the product is entirely smooth. Then the product may be allowed to set, or may be cooled or exposed to a quick chill. The result will be a product that is materially improved in consistency, appearance, and in the other characteristics as above noted.

Oily materials or foods containing liquid oils which tend to make them soft or fluid are materially improved by thickening them in accord with this invention. By so thickening them, the bodier and fat combination combines with the liquid oil responsible for the fluidity and in many cases forms a new emulsion-like product which results in several unexpected advantages as, for instance, substantially better body, improved oil stabilization, reduction of oily or fatty taste, etc.

Example XIII

An improved thickened peanut butter is made by mixing together 100 grams of peanut butter with 75 grams of the prepared thickener product of Example XI. For this purpose the prepared thickener product should preferably be made somewhat heavier or more solid in body than that of Example XI and it is also desirable, if required to adjust the final flavor, to replace some or all of the vinegar in this thickening material with water, and to increase the salt, or to make any further adjustments in flavor or in consistency.

In the making of the food compositions of this invention it is desirable in many cases to add an aeration stabilizing material or aeration agent to the compositions and then to beat or whip well so as to aerate the product. It has been found that the effect of such aeration is to substantially reduce any over-thick plasticity that might develop in some products under various conditions. Also this aeration further enhances the body and consistency of many of these compositions by improving smoothness, as well as spreadability and non-sogging quality. Examples of various aeration materials that may be used are gelatin, casein, albumen, as for instance egg albumen, and other aeration producing agents.

One of the important specific embodiments of this invention relates to the use of these bodier-hard fat or similar compositions in conjunction with emulsions and particularly with emulsions made with oils or fats and with water or other aqueous materials, but more particularly with oil-in-water emulsions such as salad dressings, mayonnaise products, and so forth.

These starch-fat or similar compositions are of particular importance since they improve the body and stability of these emulsions, aside from many other advantages which result.

For example, in the case of an oil-in-water emulsion, if more and more liquid oil is added so as to further thicken the emulsions, a limit is reached where the emulsions will get very oily and greasy, and from this point it will tend to separate because of the excess of oil that is added. In view of this, it has theretofore been impossible to thicken emulsions so as to get a satisfactory product in consistency, etc., and without the separation taking place upon the addition of the excess of oil.

However, it has now been found that with the new food thickener product of this invention oil-in-water emulsions may be readily thickened or rigidified to an extent and with resultant advantages hitherto impossible.

The food thickener material, for instance, made in accord with this invention may be added in relatively unlimited quantity so as to produce the desired thickening and still have the emulsion remain in acceptable condition. Although the emulsion will gain the desired body there will not be the development of the oiliness and greasiness that would usually be found if liquid oil, or if a hard fat by itself, were added.

With the resultant thickened emulsions, particularly where larger amounts of the thickener material is used, there is a substantially reduced tendency to separation or splitting of the emulsion, so that the products retain their desired texture and consistency over long periods of time and under varying conditions of transportation.

The advantages of these starch-fat or similar compositions in conjunction with the thickening of emulsions are probably due to the new and unusual dual characteristics of these compositions. These new dual characteristics are that these compositions have the ability to thicken or solidify materials which are fluid or soft due to their water content, and also they have the ability to thicken or solidify materials which are fluid due to their liquid oil content.

In view of this it is readily understood that with emulsions, and particularly with oil-in-water emulsions, that these emulsions are given new qualities of stabilization, improved body, etc., notwithstanding the fact that the liquid oil and the liquid water in these emulsions tend towards producing fluidity, softness, and separation.

The compositions of this invention when used in conjunction with emulsions thereby combine with the liquid oil responsible for the oil fluidity as well as with the liquid water or aqueous materials responsible for the water fluidity.

*Example XIV*

As an illustration of the use of the food thickener of this invention in conjunction with emulsions, mix together 100 grams of oil-in-water emulsion salad dressing containing about 20 to 25% salad oil, with 15 grams of the thickener material of Example XI. Instead of adding 15 grams of the thickener material, 25 grams, 60 grams or 200 grams, etc., may be added depending upon the thickness and character of product desired. It will be noticed that the thickness will increase up to the thickness of the base material itself and that a relatively unlimited amount of this bodier material may be added without resulting in any oil or water separation.

*Example XV*

As an example of the use of the food thickener material with emulsions of higher oil content, mix together 50 grams of an oil-in-water emulsion mayonnaise containing about 75% to 80% liquid salad oil, with 50 grams of the thickener material of Example XI. Likewise, 150 grams, 200 grams, etc., of the thickener material may be mixed with 50 grams of the oil-in-water emulsion mayonnaise depending upon the final characteristics required. The higher the amount of food thickener that is added, the greater will be the stabilization of the emulsion.

The thickened foods produced in accord with this invention have many unexpected advantageous qualities. It would normally be expected that a product containing fats and particularly hard fats, would have a "lardy" or greasy taste, and also that a product containing a starchy or gummy mass such as is used in the thickened food would have a thick or pasty taste.

However, by the combination of these components as outlined herein, there is produced an entirely new food product which although it contains "lardy" or fatty tasting materials and also gummy and pasty bodiers, nevertheless is substantially devoid of these undesirable characteristics.

The fact that the thickened base is largely devoid of oily character is of particular importance because of the general prejudice against oily products.

Even when the combined starch and fat or equivalent materials are used in a percentage as low as 10 to 20%, enhanced spreading qualities and taste characteristics will generally be given to food compositions, and without undesirable fattiness or gumminess. These materials may be added up to 40% or 50% without causing the expected fatty or gummy taste in the thickened compositions.

When solid fats or relatively hard fats are added to aqueous food materials they do not mix in at all or they do not mix in smoothly with the result that there is produced a separated, mottled, crumbly or otherwise undesirable product which does not have the desired smooth, thickened or heavier-bodied form. Furthermore, if materials such as gums or starches alone are used, they produce a gummy and pasty mass which is obviously objectionable. However, with this new combination of bodier material and hard fat or similar material there results an entirely new product that does not have the objectionable pastiness of starch or gum materials alone and at the same time does not have the objectionable lardy or fatty characteristics of fat materials alone.

Through the use of this new combination, there is thereby enabled the production of thickened foodstuffs of agreeable character as well as the production of substantially solid brick or form sustaining materials.

The starch-fat or similar combinations may be utilized to stiffen or to given enhanced spreading qualities to various types of products as for instance, jellies, honey, chocolate syrup, chili sauce, peanut butter, maple syrup, wines, sauces, essential oil emulsions, and also aside from the food field, it may be applied to thickening or stiffening other fluids, liquids or soft materials such as paints, cosmetics, pharmaceuticals and sizing materials. In cosmetics, for instance, there is the advantage that the fatty material is usually absorbed by the skin leaving a protective covering of the bodier material. In many cases it is possible to use in place of part or all of the fat, various waxes, such as beeswax, or mineral products such as paraffin waxes, petrolatum jelly, etc., or resins, or similar materials.

As a stiffening agent for foods, the combination of this invention is particularly valuable because of the ease with which the combined starch-fat or similar thickening material may be mixed or incorporated with other food components, particularly when it is made with the lower melting point fats. A spoon or a fork is generally sufficient. This ease of incorporation is possibly due to the fact that the particles of fat and bodier material are presumably broken down into small particles in more or less of an emulsion-like form, which is readily further dispersed.

The thickened foods or the rigidified foods may generally be readily diluted with particularly smaller amounts of water, milk, salad oil, and other similar liquids or liquid materials.

The compositions produced in accord with this invention may take the form of relatively solid products, which may be packaged in brick form or they may take the form of relatively thickened or viscous food materials, depending to a large degree upon the proportions and type, etc., of the bodier material, the aqueous material, and the hard fat, etc., in the products. These ingredients may be so regulated as to control the consistency of the food materials.

The thickened material, or the solidified materials, etc., may be readily spread on bread without oozing, may be rendered substantially devoid of sogginess and at the same time is surprisingly devoid of any starchy, oily, or gummy taste as would normally be expected from the nature of the thickening materials.

By the herein terms starch, gum, pectin or bodier material are also included materials containing large quantities of these starch, gum, pectin or bodier materials. Also by the terms fat, non-liquid oil and similar terms are included materials containing large quantities of these fats or non-liquid oils, and similar materials.

What is claimed is:

1. The method of thickening relatively high water content, relatively thin-bodied food materials, to produce products having substantially reduced soaking and oozing qualities, while retaining spreadable qualities, said method comprising dispersing and agitating with said relatively high water content food material, a non-liquid oil, and a water absorbent bodier material, said relatively high water content food material being relatively flowing in its normal condition, and said water absorbent bodier material being present in sufficient quantity so as to gelatinize substantially all of the free water that is present, said thin-bodied food material constituting over 50% of the thickened food material.

2. The method of producing thickened food materials from relatively thin-bodied, relatively high water content food materials, said method comprising combining by agitation so as to form a dispersion thereof, a thin-bodied food material, a solid fat material, and a water absorbent binder material, the thin-bodied food material constituting over 50% of the thickened food material.

3. A thickened food comprising a water absorbent material, a hard fat component, and a relatively flowing food material, said water absorbent component being present in sufficient quantity to gelatinize substantially all of the free water that is present, said flowing food material being present in major proportion in the thickened food composition, and said flowing food material containing over 20% of water.

4. A thickened food comprising a water absorbent material, a hard fat component, a relatively flowing food material, and an aqueous material, said water absorbent material being present in sufficient quantity to gelatinize relatively all of the free water that is present, and said flowing food material comprising a major portion of the thickened food composition.

5. A thickened oil-in-water emulsion, said thickened emulsion comprising a water absorbent material, an aqueous material, and a solid fat, said oil-in-water emulsion being present in major proportion in the thickened emulsion, and said thickened emulsion exhibiting substantially enhanced non-soaking and non-oozing quality.

6. A process of thickening an oil-in-water emulsion which comprises providing an oil-in-water emulsion containing liquid oil and liquid aqueous materials therein, and combining with said emulsion a thickening combination of a water absorbent material gelatinized with water, and a hard fat, and then agitating so as to form a thorough dispersion.

7. A process of making a thickened salad dressing emulsion said process comprising preparing a combination of water and a water absorbent material so as to form a final gelatinized product, and then mixing this gelatinized product with the salad dressing oil-in-water emulsion, and then mixing therewith a plastic solid fat so as to form a substantially improved salad dressing.

8. The thickened food of claim 3, the relatively flowing food material being salad dressing.

9. The thickened food of claim 3, the relatively flowing food material being prepared mustard.

10. The thickened food of claim 4, the relatively flowing food material being peanut butter.

11. The thickened oil-in-water emulsion of claim 5, the oil-in-water emulsion being salad dressing.

ALBERT MUSHER.